United States Patent [19]
Joffre et al.

[11] Patent Number: 5,150,241
[45] Date of Patent: Sep. 22, 1992

[54] LIQUID CRYSTAL ELECTRO-OPTICAL DEFLECTOR HAVING ELECTRODE ARRAY AND COMB SHAPED ELECTRODE FORMED ON RESISTIVE LAYER

[75] Inventors: Pascal Joffre, Bourg La Reine; Gerard Illiaquer, Viry Chatillon; Jean-Pierre Huignard, Paris, all of France

[73] Assignee: Thomson-CSF, Puteaux, France

[21] Appl. No.: 554,461

[22] Filed: Jul. 19, 1990

[30] Foreign Application Priority Data

Jul. 25, 1989 [FR] France .................. 89 09997

[51] Int. Cl.⁵ .................. G02F 1/13; G02F 1/29
[52] U.S. Cl. .................. 359/89; 359/41; 359/95; 359/94; 359/315
[58] Field of Search ......... 350/347 E, 347 V, 348, 350/339 R, 334, 336, 162.24, 333, 331 R

[56] References Cited

U.S. PATENT DOCUMENTS

| | | | |
|---|---|---|---|
| 3,975,085 | 8/1976 | Yamada et al. | 350/336 |
| 3,981,559 | 9/1976 | Channin | 350/336 |
| 4,035,060 | 7/1977 | Tsunoda et al. | 350/336 |
| 4,045,124 | 8/1977 | Pollack et al. | 350/348 |
| 4,066,334 | 1/1978 | Fray et al. | 350/336 |
| 4,542,960 | 9/1985 | Yang | 350/336 |
| 4,585,311 | 4/1986 | Kawamura et al. | 350/347 V |
| 4,639,091 | 1/1987 | Huignard et al. | 350/348 |
| 4,641,923 | 2/1987 | Bohmer et al. | 350/336 |
| 4,790,632 | 12/1988 | Miyakawa et al. | 350/347 V |
| 4,937,539 | 6/1990 | Grindberg et al. | 350/348 |
| 4,964,701 | 10/1990 | Dorschner et al. | 350/347 V |

FOREIGN PATENT DOCUMENTS 488177 6/1976 U.S.S.R. .

*Primary Examiner*—Stanley D. Miller
*Assistant Examiner*—Tai V. Duong
*Attorney, Agent, or Firm*—Oblon, Spivak, McClelland, Maier & Neustadt

[57] ABSTRACT

The disclosed deflector includes a thin film of liquid crystal on either side of which there is positioned at least one plane of electrodes, the assembly forming an array of elementary, quadripolar phase-shifters placed side by side, their electrodes being taken to different control potentials, generating a spatial modulation of the phase of the beam going through the deflector.

6 Claims, 7 Drawing Sheets

GRAPHS OF RADIATION
MEASURED FROM - 0.75° TO .75°

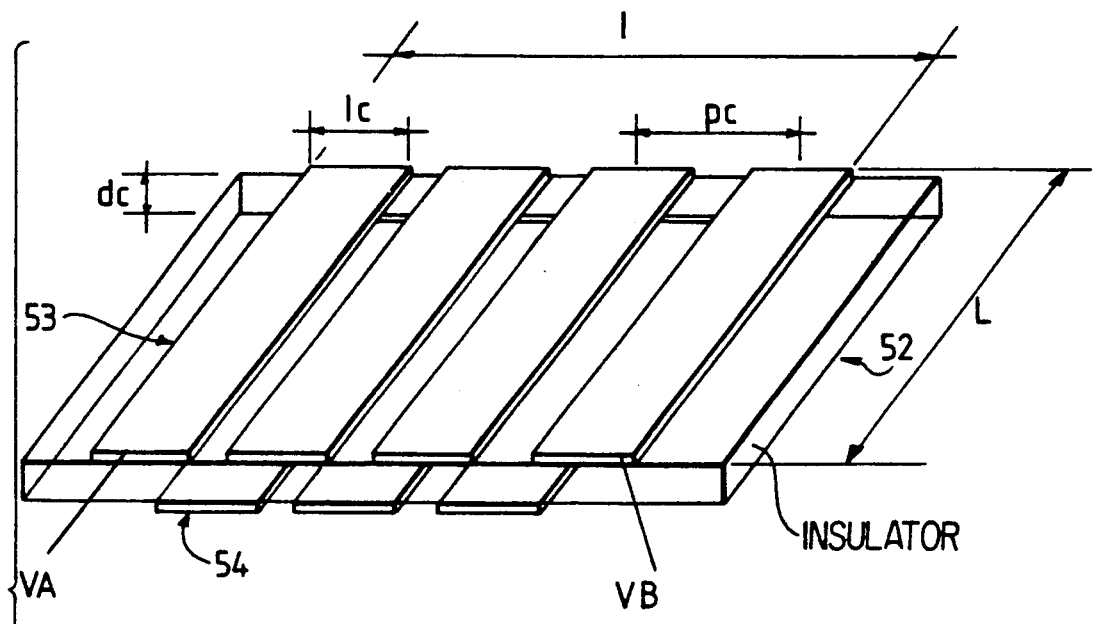
EQUIVALENT DIAGRAM
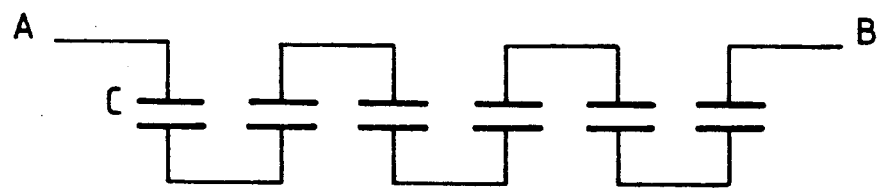
FIG.16

LIQUID CRYSTAL ELECTRO-OPTICAL DEFLECTOR HAVING ELECTRODE ARRAY AND COMB SHAPED ELECTRODE FORMED ON RESISTIVE LAYER

BACKGROUND OF THE INVENTION

The present invention pertains to a liquid crystal electro-optical deflector.

To achieve angular scanning by laser beams of opto-electronic systems such as lidars, the general practice is to use devices such as galvanometrical mirrors, holographic disks or acousto-optical deflectors. All these components are difficult to apply and they require high control power.

For the mechanical devices, the scanning speed is limited to about 1°/ms for a beam section with a diameter of 1 cm. The high inertia of the mirrors even further limits the random access time.

With acousto-optical deflectors ($LiNbO_3$, GaP, etc.), the major drawback is their very dissymmetrical pupil having typical dimensions of 100 μm×10 mm, which requires the use of cylindrical optical coupling devices. Furthermore, the beam undergoes an often troublesome frequency shift that is a function of the angle of deflection. The small angles (of less than 1°), the inadequate transmission as well as the sensitivity to polarization are all so many limits on the systems.

SUMMARY OF THE INVENTION

An object of the present invention is an electro-optical deflector that enables the direct deflection of a large-sectioned beam (10 cm or more), that does not prompt any frequency shift in the deflected beam and that enables big deflection angles (of 10° or more) to be obtained.

The deflector according to the invention has a thin film of liquid crystal on either side of which at least one plane of electrodes is positioned, the assembly forming an array of elementary quadripolar phase-shifters positioned side by side, their electrodes being carried to different control potentials and generating a spatial modulation of the phase of the beam going through the deflector.

According to a preferred embodiment, each plane of electrodes on either side of the liquid crystal film is formed by a conductive comb connected to a biasing potential, interdigitated with an array of electrodes, each connected to a different control potential. At least one part of the inter-electrode zones is formed on a resistive layer or on a capacitive layer.

According to an advantageous embodiment, the deflector according to the invention has, on either side of the liquid crystal film, two planes of electrodes on either side of the liquid crystal film, the first plane of electrodes comprising two interdigitated combs each taken to its own biasing potential and formed on a resistive surface, and the second plane of electrodes comprising an array of electrodes taken to different control potentials, these two planes being separated by an insulator layer.

According to another advantageous embodiment, the deflector has two planes of electrodes on either side of the liquid crystal film, the first plane of electrodes comprising two interdigitated combs each taken to its own biasing potential and formed on a capacitive layer, and the second plane of electrodes comprising an array of electrodes taken to different control potentials, these two planes being separated by an insulator layer.

BRIEF DESCRIPTION OF THE DRAWINGS

The present invention will be understood more clearly from the following detailed description of the several embodiments, taken as non-restrictive examples, and illustrated by the appended drawings, in which:

FIG. 16 shows a simplified view in perspective of a capacitive layer according to the invention, with its equivalent electrical diagram, this layer being capable of replacing the resistive layer in the structures according to the invention.

DESCRIPTION OF PREFERRED EMBODIMENTS

Figure 1:
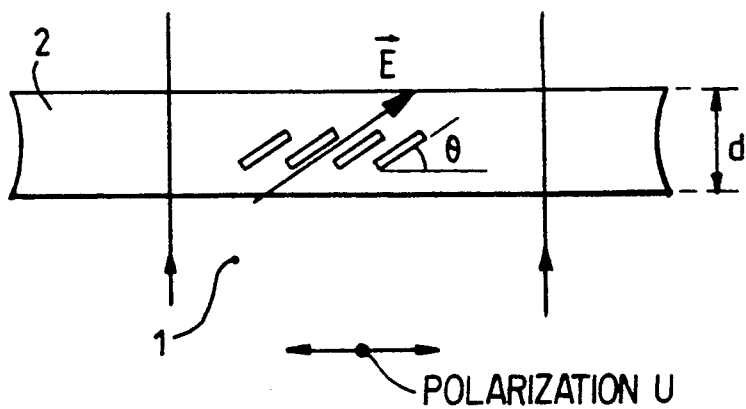
FIG. 1 shows a simplified sectional view of a thin film of liquid crystal, used to explain the phenomenon of electrically controlled birefringence.

The principle of modulation of a polarized optical wave 1 going through a film 2 of nematic liquid crystal (FIG. 1) is known as the Friederikcsz effect of electrically controlled birefringence. The liquid crystal molecules with high dielectric permittivity $\Delta\epsilon$ undergo a torque $\Gamma$ tending to align them in the direction of the electrical field $\vec{E}$. The expression of this torque depends on the relative angle $(\theta - \phi)$ between molecules and field:

$$\Gamma = \Delta\epsilon E^2 \sin 2(\theta - \phi) \qquad (1)$$

At equilibrium, the torque is zero and $\theta = \phi$. The optical phase is thus controlled from 0 to $2\pi d \, \Delta n/\lambda$, taking into account the thickness d and the birefringence $\Delta n = n_E - n_o$. It may be noted that to control the amplitude of the wave, it is enough to place the sheet of liquid crystal between a polarizer and an analyzer, crossed with an angle of 45° between them and a factor $d\Delta n$ equal to $\lambda/2$.

The great value of liquid crystals is that thicknesses of some microns are sufficient to create optical path variations $d\Delta n$ of $\lambda$. These conditions are achieved at a wavelength of 10.6 μm in the infrared with only 50 μm of cyanobiphenyl, the transparency of which extends over a wide spectral region ranging from 0.5 μm to 15 μm.

The response time is a function of the electrical field. It varies as the converse of the torque $\Gamma$ and follows the following relationship:

$$\tau = \pi \eta / E^2 \Delta \epsilon \qquad (2)$$

where $\eta$ is the static viscosity of the liquid crystal medium. A field E of 10 V/μm corresponds to a time approaching 10 μs. The nematic liquid crystals are therefore electro-optical materials that are very valuable by virtue of their instrinsic properties. These properties are not fully exploited in a conventional bipolar electrode structure (FIG. 2) for the electrical field cannot have a fixed direction perpendicular to the transparent electrodes.

Figure 2:
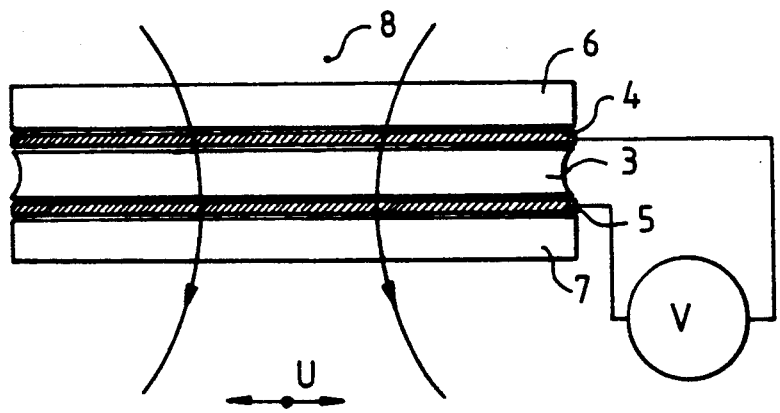
FIG. 2 shows a sectional view of a known bipolar liquid crystal structure.

This structure of FIG. 2 includes a film 3 of liquid crystal positioned between two transparent electrodes 4, 5 connected to a voltage source V. The assembly is enclosed between two transparent supporting sheets 6, 7. A polarized optical wave 8 goes through this structure.

It is the equilibrium between the torque due to the electrical field and the torque due to the elastic pull-back that actually enables the phase to be controlled. But the phenomenon of elastic relaxation of the molecules, when there is no field, is extremely slow, namely 1s for d=25 μm. A triode type structure of electrodes has already been proposed to overcome this drawback, and has shown good results, but it is still ill-suited to the great thicknesses of liquid crystal required in the infrared range.

Figure 3:
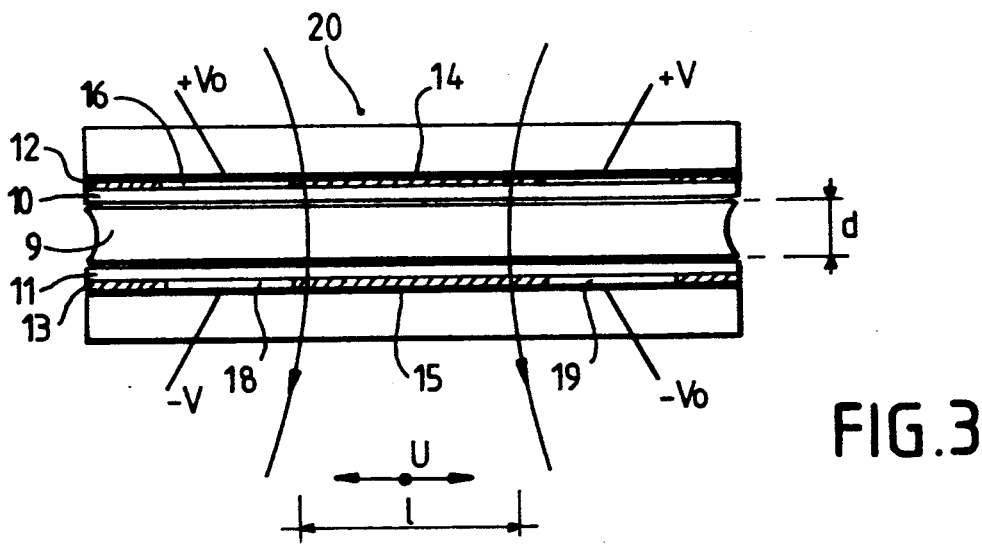
FIG. 3 shows a sectional view of an elementary quadripole phase-shifter used in an electro-optical deflector according to the invention.

The structure according to the invention, shown in FIG. 3, enables a very appreciable increase in the dynamic characteristics of an elementary liquid crystal phase-shifter.

This structure of FIG. 3 includes a film 9 of liquid crystal placed between two insulating and transparent sheets 10, 11. On each of these sheets 10, 11, a composite layer 12, 13 is placed. Each of these composite layers 12, 13 includes a resistive strip 14, 15, respectively, on which metallic strips are formed. The metallic strips formed on the layer 12 are referenced 16, 17 and those formed on the strip 15 are referenced 18, 19. The metallic strips 16 to 19 are the electrodes of the structure. The strips 16 and 18 face each other, and this is also the case with the strips 17 and 19.

The direction of the field E is a function of the four potentials applied to the electrodes 16 to 19. With the electrodes 16 and 19 at biasing potentials $V_o$ and $-V_o$, respectively, the electrodes 17 and 18 are used for the control, properly speaking, of the potentials V and $-V$, respectively.

An elementary computation assuming a uniform field in the inter-electrode zone gives the expression of the electro-optical response of the phase-shifter.

$$\phi(\theta) = \frac{2nd}{\lambda} \left[ \frac{1}{\sqrt{\frac{\cos^2\theta}{n_e^2} + \frac{\sin^2\theta}{n_o^2}}} - n_o \right] \qquad (3)$$

$$\theta(V/V_o) = \arctan\left( \frac{l}{d} \cdot \frac{V/V_o + 1}{V/V_o - 1} \right) \qquad (4)$$

with $n_o$ and $n_e$ = ordinary and extraordinary indices.

Figure 4:
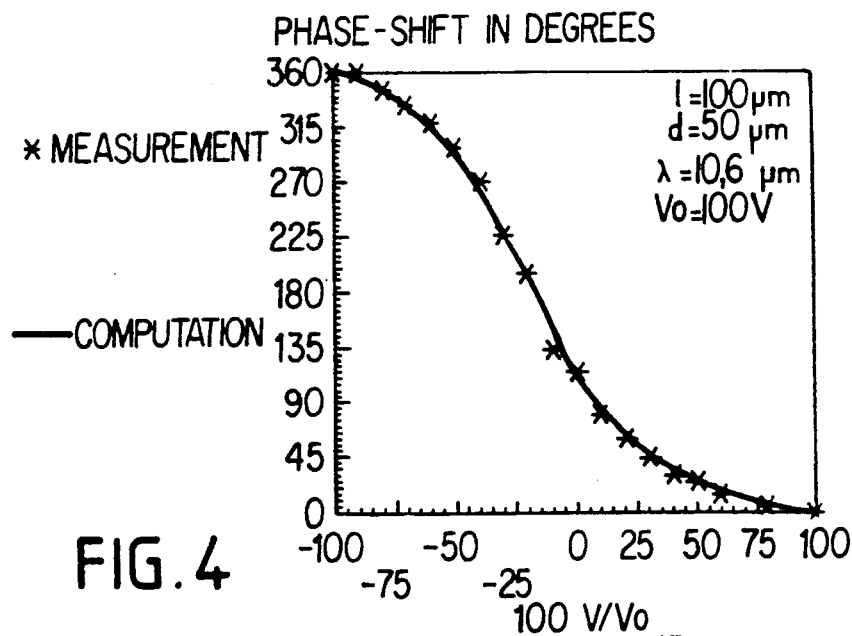
FIG. 4 shows an electro-optical response curve of the phase-shifter of FIG. 3.

For a given geometry (1, d) and a given liquid crystal (1 being the distance between the electrodes 16 and 17 or 18 and 19, namely the width of the strips 14 and 15, and d being the thickness of the liquid crystal 9), the phase depends only on the ratio of voltages $V/V_o$ and no longer on the conditions of the liquid crystal clinging to its walls. A total insensitivity to the variations in temperature and a high precision result therefrom. FIG. 4 shows the computed curve $\phi(V/V_o)$ for $V/V_o$ varying between $-1$ and $+1$ and shows a very extended linear zone, for the following parameters: $l = 100$ μm, $d = 50$ μm, $\lambda = 10.6$ μm (wavelength of the beam going through the liquid crystal) and $V_o = 100$ v.

Figure 5:
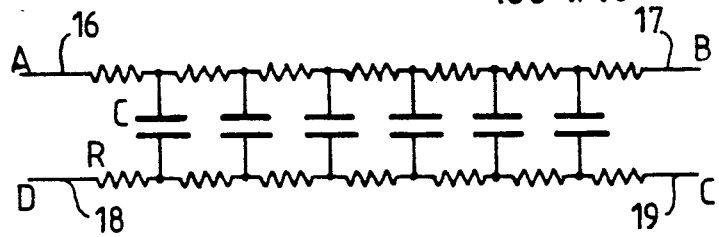
FIG. 5 shows an electrical diagram of a model of the structure of FIG. 3.

The dynamic aspect of the structure depends on the characteristics of the resistive layer deposited between the electrodes 16 and 17 (or 18 and 19). Its essential role is to make the electrical charges flow with sufficient speed between these electrodes. The liquid crystal behaves like a pure dielectric for working frequencies of over 100 Hz, which is usually the case. On the assumption that $d << l$, the structure may be likened to an RC electrical line according to the equivalent diagram of FIG. 5. The model then makes it possible to estimate the resistance R of the resistive layer for a given limit operating frequency $f_1$ and a given electrode geometry (1, d):

$$R = \frac{d}{2 f_l \epsilon l^2} \qquad (5)$$

The control power per unit of area is divided into active power $P_j$ dissipated by Joule effect in the resistive layer and reactive power $P_R$ dissipated in the generator. Their expressions are as follows.

$$P_j = \frac{V^2}{R l^2} \qquad P_r = \frac{\epsilon}{d} V^2 f \qquad (6)$$

When the frequency f is close to the limit frequency $f_1$, the reactive power represents half of the active power. Thus, these two power values are of the same magnitude. The resistive layer leads to only a reasonable increase in the control power needed when its resistance is optimized for the frequency of use.

Figure 6:
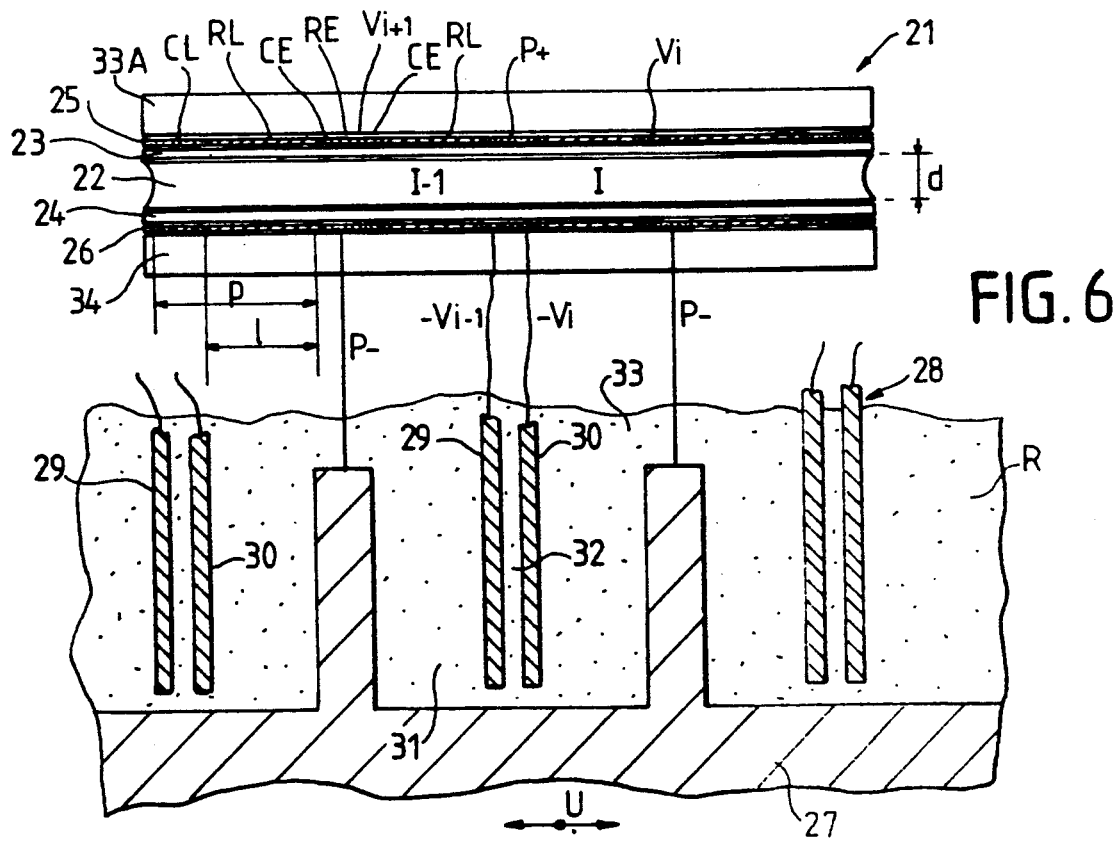
FIG. 6 shows a sectional view and a plane view of a deflector according to the invention.

The array 21 of FIG. 6 includes a film 22 of liquid crystal between two insulating and transparent sheets 23, 24. Each of the sheets 23, 24 is covered with a composite layer 25, 26 respectively. Each of the layers 25, 26 includes a resistive surface R on which conductive electrodes with the following configuration are formed: firstly, a comb 27 and, secondly, an array 28 of electrodes interdigitated with the comb 27. This array 28 has a succession of pairs of narrow electrodes 29, 30, each of these pairs being placed between two successive teeth P+ (or P− for the layer 26) of the comb 27, in parallel with these teeth and centered with respect to them. The teeth P+ are wider than the electrodes 29, 30. Thus, for each of the layers 25, 26, in a direction perpendicular to the electrodes, and without taking account of the parts of the resistive layer that are covered by conductive electrodes, the following alternation is obtained: a wide conductive strip P+, a wide resistive strip 31, a narrow conductive strip 29, a narrow resistive (or preferably insulating) strip 32, a narrow conductive strip 30 and a wide resistive strip 33, and so on. The width (taken in the direction in which the strips succeed one another) of the narrow conductive strips is, for example, equal to a quarter of the width of the wide conductive strips, that of the narrow resistive strips is equal to about half of the width of the wide conductive strips, and that of the wide resistive strips is equal to about four times the width of the wide conductive strips. In one exemplary embodiment, the width of the wide conductive strips P+ (or P−) and of the resistive strips is about 40 μm and 160 μm respectively. The layers 25 and 26 are positioned in such a way that each wide conductive strip P+ or P− of each of these layers faces one set of the other layer comprising two short conductive strips and one narrow resistive strip (29, 32, 30).

The wide conductive strips P+ and P− of the layers 25, 26 are taken to biasing potentials $V_o$ and $-V_o$. The narrow conductive strips of each set of two narrow conductive strips 29, 30, enclosing one narrow resistive strip 32, respectively receive, for example from left to right in the drawing, voltage steps having the respective values $V_{i-2}$, $V_{i-1}$, $V_i$, $V_{i+1}$ etc. for the electrodes of the layer 25. In the layer 26, the narrow conductive strips receive voltages respectively having the values $V_{i-2}$, $V_{i-1}$, $V_i$, $V_{i+1}$ etc.

The above-described assembly is positioned between two transparent and insulating supports 33A, 34.

In one variant, not shown, each set of two narrow conductive strips enclosing a narrow resistive strip is replaced by a conductive strip having the width of this set and receiving control voltages $V_i$ and $-V_i$ for the layers 25, 26 respectively.

Figure 8:
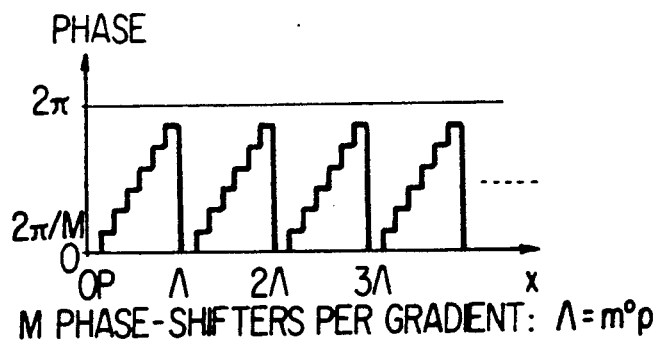
FIG. 8 is a graph showing the phase profile of the beam transmitted by a deflector according to the invention.

The electrodes P+ and P− are used for polarization and are respectively taken to potentials $V_o$ and $-V_o$. Each phase-shifter, identified by the index i, is controlled individually by means of its two electrodes at the potentials $V_i$ and $-V_i$. A phase profile such as the one shown in FIG. 8, which is a linear profile, characterized by M levels spaced out by $2-/M$ at the pitch p, forms a spatial array Λ to which there corresponds an angle of deflection $\alpha = \lambda/\Lambda$, and a diffraction efficiency given by the following relationship:

$$\frac{I_{max}}{I_{min}} = \left[\frac{\sin n/M}{n/M}\right]^2 \qquad (7)$$

| M = | 2 | 3 | 4 | 5 | 10 |
|---|---|---|---|---|---|
| $I_{max}/I_o =$ | 40% | 68% | 81% | 88% | 97% |

The section Φ of the array defines a diffraction lobe with an aperture λ/Φ fixing the angular aperture of the elementary point; the number N of distinct positions according to the criterion of Rayleigh is then deduced from the maximum angle $\alpha_{max}$ corresponding to a spatial period comprising four phase-shifters:

$$\alpha_{max} = \frac{\lambda}{4p} \qquad N = \frac{\Phi}{2p} \qquad (8)$$

This deflector can also work with linear phase profiles of 0 to 2 mπ with m as a whole number. The angle of deflection is then written as $\alpha = m\lambda/\Lambda$. It is possible to preserve high efficiency on a wide spectrum in meeting this condition.

Other profiles such as parabolic profiles can be used, in a manner known per se, to focus the beam variably for applications in adaptive optics (see for example, S. T. KOWEL, "Adaptive Spherical Lens", in "*Applied Optics*", Vol. 23, No. 16/15, August 1984).

Figure 7:
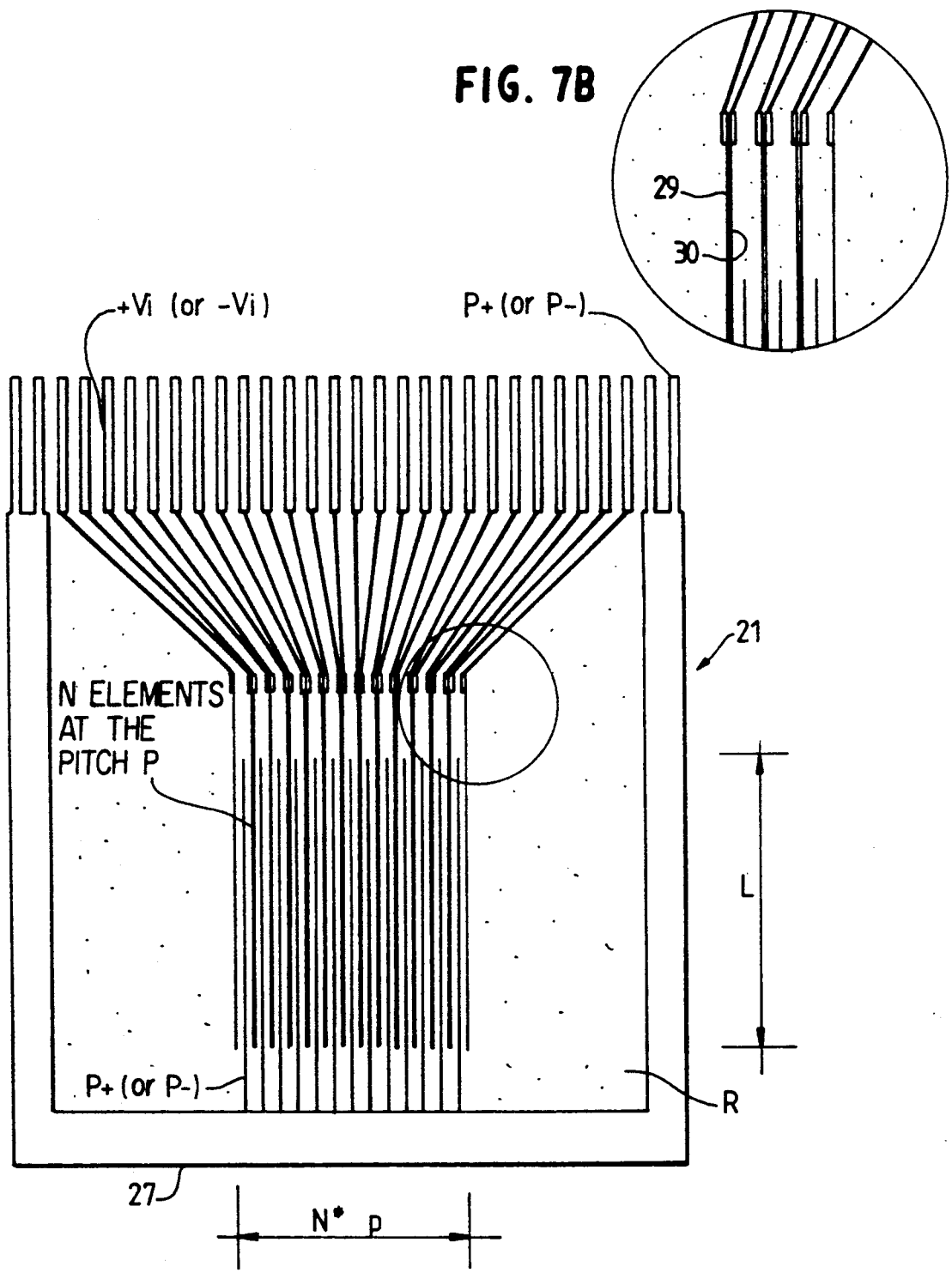
FIG. 7A-B shows a plane view of the array of electrodes of the structure of FIG. 6.

The liquid crystal deflector shown in FIGS. 6 and 7 can be made as follows. In order to work in the infrared range, at a wavelength of about 10.6 μm, supports made of ZnSe are used. The metal electrodes are made of chromium-gold, the resistive layers are made of amorphous silicon with a thickness of 1000 Å (R = 1000 MΩ²). The pitch of the phase-shifters is 200 μm for an inter-electrode distance 1 of 160 μm. The inter-electrode separation between phase-shifters is 20 μm. The insulator layer, consisting of 1 μm of polyimide, is also used for the alignment of the liquid crystal (Cyanobiphenyl), the thickness of which is 50 μm. The useful section of the array is 10 mm × 10 mm with 50 phase-shifters controlled individually in sinusoidal voltage with a frequency of 1 kHz, the root mean square value of which varies from 0 to 100 v.

Figure 9:
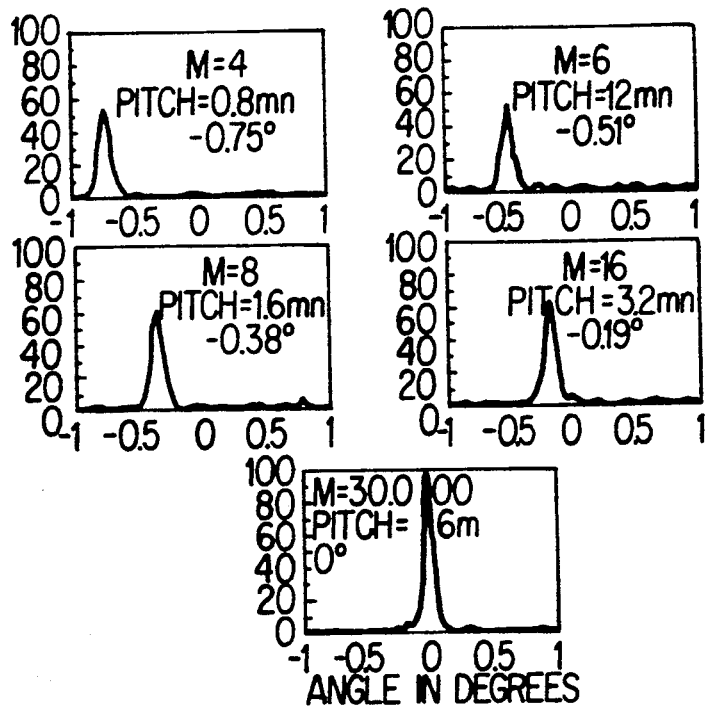
FIG. 9 is a set of graphs of radiation for different pitches of the array corresponding to different configurations of the control signals.

A deflection of ±0.75° is obtained in accordance with the relationship (8) with a resolution of more than 20 points, as shown in FIG. 9 which shows the graphs of radiation measured. The level for M = 4 is 60% of the level on the axis instead of 80% as laid down by the relationship (7) because of the 20% masking of the pupil by the electrodes.

The response time for setting up the array is about 1 ms at $V_o$ = 100 v.

It is particularly worthwhile to use a semiconductor such as GaAs as a support material for it is thus possible to make electrodes that are transparent to the infrared by simply controlling the surface doping. Thus, Si doped GaAs leads to layers of R < 100Ω/square section perfectly transparent to λ = 10.6 μm. The resistive layers can also be obtained by this method. Ion implantation notably is well suited to very small doses. The connections on these layers should be ohmic contacts constituted by AuGe on GaAs, Au on Si in order to prevent drops in potential at the contacts.

Furthermore, it is useful to etch the resistive layer in the inter-element space (such as the space 32 of the FIG. 6) s as to permit higher voltages to be applied to the liquid crystal.

On an insulator support such as glass or BaF₂, the transparent electrodes can be made of indium tin oxide (ITO) up to a wavelength of 'b μm, and of In₂O₃ beyond this wavelength. The resistive layers are made of silicon deposited as a thin layer, silicon carbide etc.

Figure 10:
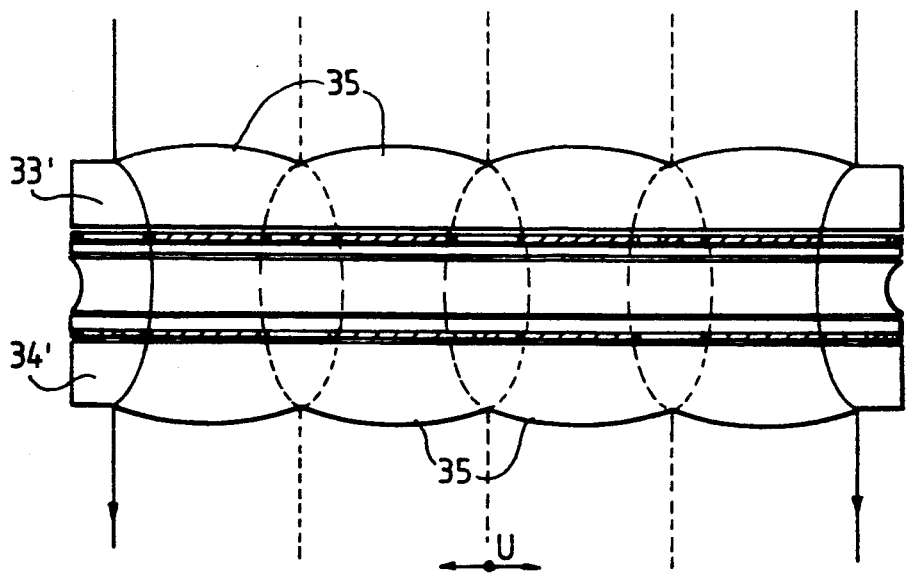
FIG. 10 shows a simplified sectional view of a deflector with micro-lenses according to the invention.

As shown in FIG. 10, in micro-etching external faces of the two supports 33', 34' in the form of arrays of micro-lenses 35 having the same pitch as that of the phase-shifters, the efficiency of diffraction is considerably improved. There is no longer any masking of the pupil by the electrodes, and the phase profile for each phase shifter is more uniform. In such a structure it is possible, provided that the interfaces are suitably matched by means of anti-reflection layers, to obtain an efficiency limited only by the absorption of the liquid crystal, namely an efficiency of 80% at $\lambda = 10.6$ μm.

The depth of the etching z is determined by assuming the cylindrical profile enabling easy computation of the focal distance of the lenses which are adjusted to the thickness of the supports with an index n, given the negligible thickness of liquid crystal.

$$\Delta z = \frac{np^2}{8f(n-1)} \quad (9)$$

That is $\Delta z = 0.7$ μm for $n=3.3$, $p=100$ μm and $f=3$ mm. The etching depth is therefore very small and compatible with photo-etching techniques suited to materials like GaAs or Ge.

Figure 11:
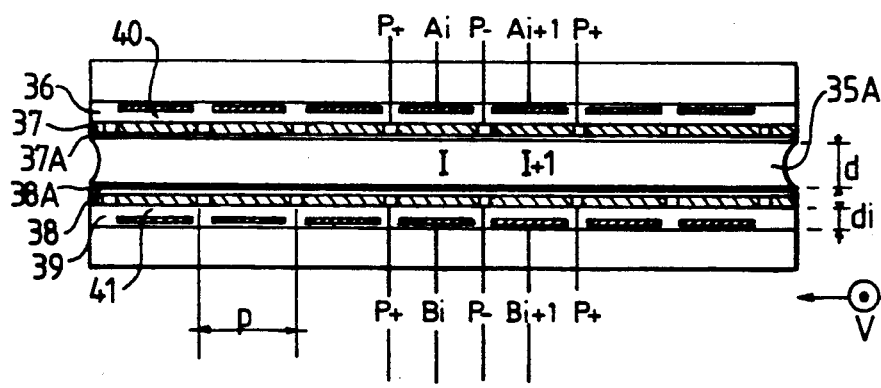
FIG. 11 shows a simplified sectional view of another deflector structure according to the invention.
Figure 12:
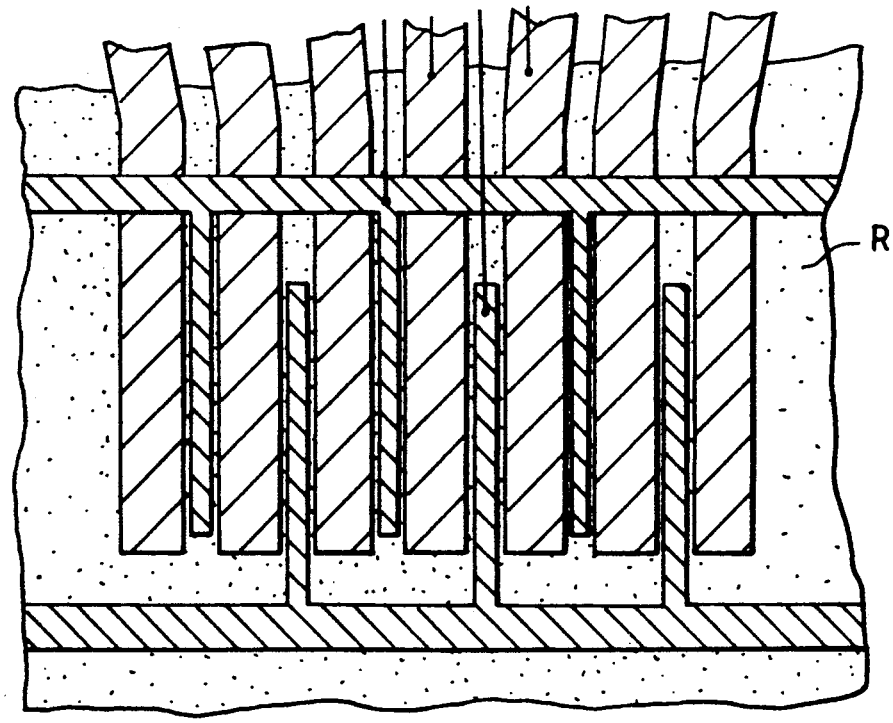
FIG. 12 shows a top view of the two planes of electrodes of the structure of FIG. 11.

A structure that is more elaborate than the above one is shown schematically in FIG. 11. This structure is distinguished by two levels of electrodes 36(39) and 37(38) separated by an insulator layer 40(41). The liquid crystal film is referenced 35A. This film is preferably insulated from the levels of electrodes 37 and 38 by insulator layers 37A, 38A respectively. The first level 36(39) is constituted by transparent electrodes $A_i$ (or $B_i$), the second layer 37(38) is constituted by biasing electrodes P+ and P− formed on a resistive layer R. The electrodes P+ and P− are respectively at the potentials $V_o$ and $-V_o$ so as to create a cross field of bias in their plane. The control voltages V and −V are applied to $A_i$ and $B_i$ and create the longitudinal field of perpendicular control. The electro-optical response resulting from the combination of these two fields is the same as the one given by the relationship (3) but with a dependence that is slightly different for $\theta$:

$$\theta(V/V_o) = \mathrm{arc\,tg}\left(\frac{l}{(d+2di)} \cdot \frac{V/V_o + 1}{V/V_o - 1}\right) \quad (10)$$

with di representing the thickness of the insulator layer 40(41).

The main advantage of this configuration is that it prevents strong electrical surface fields between the electrodes. Indeed, the insulator layer 40(41) can tolerate far higher fields in the direction of its thickness. A 120 V/μm field is permissible therein: this corresponds to a 30 V/μm field applied to the liquid crystal and to a response time of $\tau \approx 1$ μs.

Furthermore, this structure is more favorable to the working of the resistive layer since this layer is above all affected for the cross field, where its resistance is minimal. For the longitudinal field, the resistance increases by field effect and thus limits the dissipation of energy by Joule effect. Finally, the masking of the pupil due to the electrodes is smaller, and the phase profile is more homogeneous. To simplify the control, it is possible to combine the electrodes Bi in a single ground so as to work only with the electrodes Ai. It must also be noted that this structure enables the processing of both polarizations U and V (FIG. 11). For the polarization V, it is enough to achieve a 90° intersection of the electrodes P+ and P− with the electrodes $A_i$ and $B_i$. It is thus possible to make a deflector independent of the polarization by means of two such arrays, placed one behind the other.

This structure may be used advantageously as a shutter (modulator with two states, open or closed). In applying a low frequency to the terminals of P+ and P− with ($A_i$, $B_i$) at 0, the transversal state is very homogeneous and does not call for an excessively low resistance R. For example, a cut-off frequency of some kHz is sufficient. The longitudinal state is obtained, on the contrary, with a high frequency, of some tens of kHz, applied between $A_i$ and $B_i$ for P+ and P− at 0.

Figure 13:
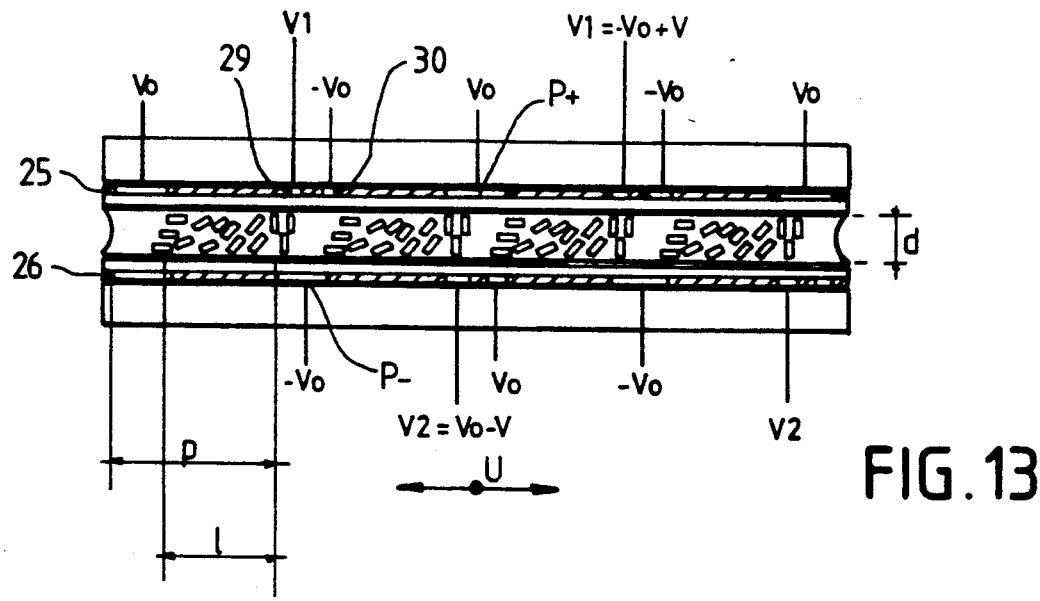
FIG. 13 shows a simplified sectional view of a deflector structure with index gradient according to the invention.

The diagram of FIG. 13 represents a deflector array structure (with index gradient) identical to the quadripole array structure of FIG. 6, but for which the electrical network is simplified since it is set up solely by the voltage V. In this structure, the large electrodes P+ are carried to $V_o$, the electrodes 29 are carried to $V_1 = -V_o + V$ and the electrodes 30 to $-V_o$ for the layer 25. For the layer 26, the electrodes P−, 29 and 30, are respectively taken to $-V_o$, $V_2 = V_o - V$, and $V_o$. In the case of maximum deflection, the index varies linearly from one end to the other of each elementary phase-shifter, from its extraordinary value $n_e$ to its ordinary value $n_o$.

$$\alpha_{max} = \pm \frac{(n_e - n_o)d}{\tau} \quad (11)$$

That is $\pm 6°$ with $d=50$ μm, $\Delta n = 0.2$ and $p=100$ μm.

The angle $\alpha$ between $-\alpha_{max}$ and $+\alpha_{max}$ depends on the amplitude of the voltage V applied, the negative part being obtained by reversing, firstly, $V_1$ and $-V_o$ and then, secondly, $V_2$ and $V_o$. The relationship of variation may be determined from the computation of the field lines between the electrodes in assuming that the liquid crystal molecules get aligned in parallel to the field. The number of points N depends on the wavelength $\lambda$ according to the relationship:

$$N = \frac{2(\Delta n d)}{\lambda} \quad (12)$$

Figure 14:
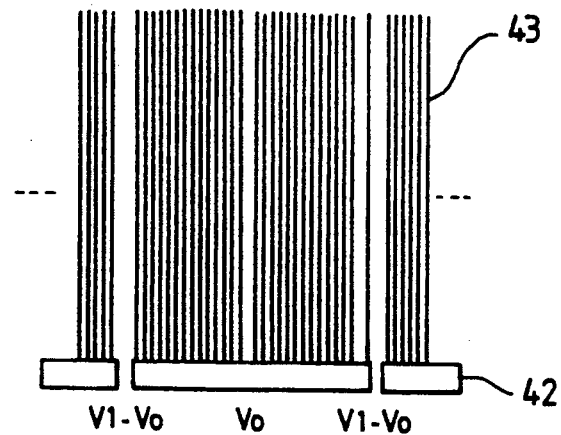
FIG. 14 shows a top view of an alternative embodiment of the resistive layer for a phase-shifter structure according to the invention.

We have $N=40$ for $\lambda = 1$ μm and the same conditions as above. A variant of this structure (FIG. 14) can be envisaged by shifting the resistive layer (localized layer 42) by means of transparent electrodes 43 providing for the transfer of potential to the liquid crystal. This layer 42 may then be formed by a more ordinary material, such as carbon for example, with a shape designed to obtain an almost linear profile. It will be noted that the shifting of the resistive layer may be done for all the other structures of the invention.

Figure 15:
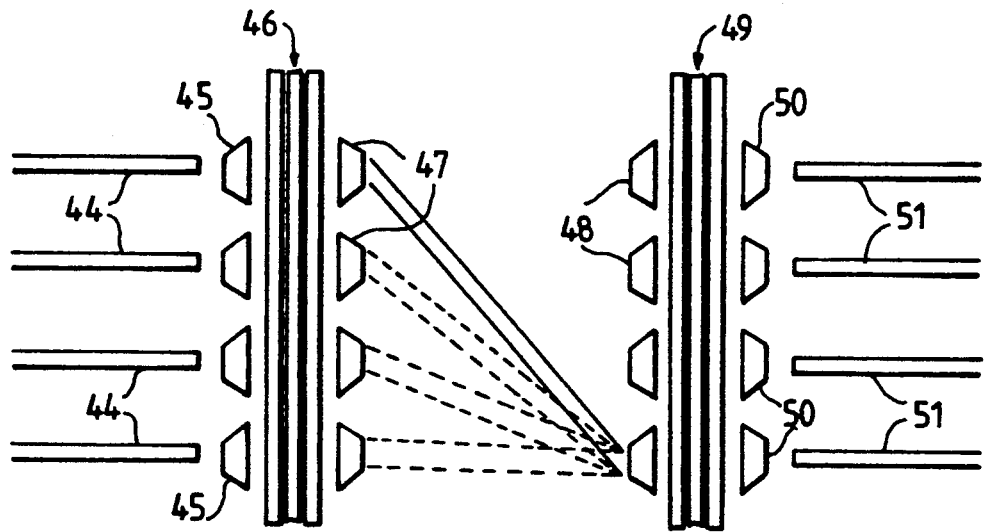
FIG. 15 shows a simplified drawing of an optic fiber change-over switch using deflectors according to the invention.

FIG. 15 shows an advantageous mode of use of a deflector such as this in a system for the switching of optic fibers. Each input fiber 44 of a matrix, for example 30×30, successively goes through an afocal lens 45, enlarging the beam, a deflector element 46 according to the invention and another afocal element 47 reducing the beam. The system is identical at the output fibers (afocal lens 48, deflector 49, afocal lens 50 and output fibers 51). With a surface ratio of 10 between the large face and the small face of the afocal lenses 45, 47, 48 and 50, an amplitude of deflection of 3°, an angle of 30° is obtained after the afocal lens 47. This value is suitable for the dimensions of systems of this type.

The resistive layer used in all these devices may have drawbacks in certain cases. These are the difficulty of adjusting the resistance, the problem of compatibility between transparence and conductivity and poor thermal behavior. The invention therefore proposes to replace the resistive layer of all the embodiments by a capacitive layer, shown schematically in FIG. 16. This capacitive layer 52 is formed by two arrays of transparent electrodes 53, 54, with a width $l_c$ and a pitch $p_c$, separated by an insulator layer with a thickness $d_c$ and a relative permittivity $\epsilon_c$. With a half-pitch shift between the two arrays, this structure is equivalent to a succession of capacitors placed in series, for which the value c, expressed by unit of length L, is expressed by the following relationship, provided that $l_c = 3/4 p_c$.

$$C = \frac{\epsilon_c p_c}{4 d_c} \qquad (13)$$

giving c=25 pF/cm for $\epsilon_c = 3.5$, $p_c = 10$ μm and $d_c = 300$ A. The capacitance $C_{(A,B)}$ is equal to 20 times less, giving 1.3 pF/cm for 10 pitches. The end electrodes of one of the arrays is respectively taken to potentials VA and VB.

As in the case of the resistive layer of the invention, the quadripolar structure of the invention is optimized in its electrical operation when the transversal and longitudinal impedances are of the same order. This condition is achieved for $l = 100$ μm and $d = 50$ μm where the capacitance $C_{(AB,CD)}$ equals 1.7 pF/cm.

This layer provides for electrical conduction in its own plane but without dissipation of energy. This is very favorable for its thermal behavior and for limiting the control power.

What is claimed is:

1. A liquid crystal electro-optical deflector through which a beam to be deflected is passed, comprising:
   a thin film of liquid crystal;
   two arrays of electrodes, each of said arrays positioned on each side of said thin film of liquid crystal, each electrode of each of said arrays of electrodes being connected to a different potential;
   comb-type electrodes, each of said comb-type electrodes being connected to a predetermined biasing potential and interdigitated with electrodes of each of said arrays of electrodes; and
   resistive layers, each of said arrays of electrodes and each of said comb-type electrodes being formed on each of said resistive layers;
   wherein said liquid crystal, said arrays of electrodes, said comb-type electrodes and said resistive layers form an assembly of phase-shifters positioned side-by-side for generating a spatial modulation of a phase of a beam passing through the deflector.

2. The deflector according to claim 1, further comprising an insulator layer interposed between said thin film of liquid crystal and each of said arrays of electrodes.

3. The deflector according to claim 1, wherein the resistive layer is shifted.

4. The deflector according to claim 1, further comprising a pair of partially transparent supporting plates to enclose the assembly, and having external faces etched in the form of arrays of micro-lenses.

5. A deflector according to claim 1, wherein the array of electrodes is formed by at least three interdigitated comb-type electrodes, taken to different control voltages.

6. A deflector according to claim 1, wherein the array of electrodes comprises two electrodes between each tooth of the comb-type electrode.

* * * * *